United States Patent [19]
Gayman

[11] Patent Number: 5,091,079
[45] Date of Patent: Feb. 25, 1992

[54] SLUDGE TREATMENT APPARATUS

[76] Inventor: Danny Gayman, 24104 11th Ave. South, Des Moines, Wash. 98198

[21] Appl. No.: 691,692

[22] Filed: Apr. 26, 1991

Related U.S. Application Data

[62] Division of Ser. No. 491,070, Mar. 9, 1990, Pat. No. 5,037,560.

[51] Int. Cl.$^5$ .............................................. B01D 33/00
[52] U.S. Cl. ................................... 210/175; 210/177; 210/178; 210/179; 210/180; 210/181; 210/199; 210/400; 210/401; 210/406; 210/205
[58] Field of Search .............. 210/175, 177, 178, 179, 210/180, 181, 199, 205, 406, 400, 401, 748, 749, 751, 758, 766, 767, 770, 774, 737, 729; 110/229; 252/301.18, 632

[56] References Cited

U.S. PATENT DOCUMENTS

| | | | |
|---|---|---|---|
| 4,043,047 | 2/1977 | Galliker | 210/748 |
| 4,221,680 | 9/1980 | Hardwick | 252/632 |
| 4,226,712 | 10/1980 | Kamei | 210/770 |
| 4,242,220 | 12/1980 | Gentaku | 210/770 |

Primary Examiner—Robert A. Dawson
Assistant Examiner—David Reifsnyder
Attorney, Agent, or Firm—Thomas L. Bohan

[57] ABSTRACT

A process and apparatus for reducing sludges, especially those sludges containing heavy metals and generated in electroplating, to a solid state where the toxic constituents of the waste are prevented from leaching. The process involves mixing a metallic soap with the sludge and then using low-temperature induction heating to form coacervate bonds that encapsulate the toxic waste particles in a pumice-like matrix. The apparatus allows a small amount of metallic soap to be thoroughly mixed through sludge and a continuous ribbon of the resulting putty-like waste to be fed into a series of microwave drying ovens and evacuation chambers. After the drying and dewatering sequences, the apparatus extrudes a pumice-like solid suitable for disposal in accordance with EPA regulations.

6 Claims, 2 Drawing Sheets

SLUDGE TREATMENT APPARATUS

This is a division of application Ser. No. 491,070 filed 03/09/90, now U.S. Pat. No. 5,037,560.

BACKGROUND OF THE INVENTION

1. Field of the Invention

This invention relates to the treatment of industrial waste, especially sludge generated by electroplating operations. More particularly, this invention consists of a process and apparatus designed to deal with that form of electroplating waste designated by the U.S. Environmental Protection Agency (EPA) as F006 sludge. The objective achieved by the invention is the stabilization of F006 sludge against leaching—as measured by the Toxic Characteristic Leaching Procedure (TCLP) [40 CFR § 1.268, Appendix 1 (7-1-88)]—to the degree that the treated material meets EPA leach-resistant requirements for landfill disposal pursuant to the Hazardous and Solid Waste Amendments of 1984 (HSWA) [98 Stat. 3221] and to the Resource Conservation and Recovery Act of 1976 (RCRA) [U.S. Code 1982 Title 42 § 6901 et seq. Oct. 21, 1976, P.L. 94-580, 90 Stat. 2795].

Industrial waste disposal is becoming ever more tightly regulated, especially with respect land disposal in sanitary land fills. The EPA is required to classify hazardous wastes and to prohibit their land disposal unless certain very stringent conditions are met. For the purposes of the present invention, the wastes generated by industrial electroplating are of particular interest. Such wastes have been divided into different categories, depending on the identity of their major constituents and the specific electroplating process producing them. These categories are denominated as F006, F007, F008, ... F0mn. [See, for example, EPA/530-SW-88-0009-I, Best Demonstrated Available Technology (BDAT) Background Document for F006, Volume 13 (Proposed), May 1988.] Although the present invention is directed toward F006 wastes, it can be modified to deal with several of the other F0mn categories as well. F006 sludge is broadly defined in 40 CFR § 1.268.10 as:

> Waste-water treatment sludges from electroplating operations except from the following processes: (1) Sulfuric acid anodizing of aluminum; (2) tin plating on carbon steel; (3) zinc plating (segregated basis) on carbon steel; (4) aluminum or zinc-aluminum plating on carbon steel; (5) cleaning/stripping associated with tin, zinc and aluminum plating on carbon steel; and (6) chemical etching and milling of aluminum.

Electroplating is key to a wide range of industry because it enables one to: (1) provide corrosion protection for a multitude of items; (2) control the surface resistivity of electronic devices; (3) apply a decorative or functional coating to a myriad of items. Since the electroplating industry is a sizable part of the industrial economy and electroplating by its nature creates a high volume of hazardous waste by-products, anything which limits the freedom of the industry to dispose of such by-products has a very high economic impact. Viewing the problem from a different perspective, one notes the extreme importance to society's general well-being that hazardous wastes be disposed of in a manner which minimizes the air and water release of the toxic, mutagenic, teratogenic, and carcinogenic components of that waste. The U.S. Congress through the EPA has ruled that such waste, before it can be deposited in landfills where it eventually will be exposed to leaching agents (primarily water run-off), must be able to pass stringent tests of stability with respect to potential leaching of any "scheduled" compounds. These tests are codified by the EPA in terms of TCLP toxicity levels which the waste must not exceed if it is to be directly deposited into a sanitary land fill—the only practical disposal mode in view of the total annual tonnage involved.

Specifically, the invention calls for thoroughly mixing extraordinarily small quantities of certain metal salts, in particular metal soaps—salts of the fatty acids such as stearic acid, oleic acid, and palmitic acid—with the sludge, extruding the mixture, and then transferring energy to it by induction heating at relatively low temperatures. The water which is forced to the surface of the extruded sludge mixture—as the result of the heating and the formation of hydrophobic bonds—is removed in part by evacuating the region around the product. It is also removed in part by direct mechanical methods, thus reducing the total heat which must be introduced. It is apparently the removal of free and loosely-bound water and the formation of micromatrices within the extruded sludge that effectively binds the waste's toxic components to the degree that the end product passes the TCLP tests.

2. Description of Prior Art

Even though it is only relatively recently that the F006 disposal situation has become extremely acute, the problem of what to do with heavy-metal-contaminated effluent streams has confronted the metal-plating and electronics industries for years. One early approach to the problem was simply to dry the sludge in large conventional ovens and then to place it in landfills. This action implied a certain obliviousness to the leaching dangers, since conventional drying does not detoxify electroplating sludges to the point where they can be safely deposited in landfills. The inadequacy of this technique is clear in the light of the EPA standards referred to above. Sludges treated simply by conventional heating are not able to comply with the TCLP-based criteria set out by the EPA.

Recognizing the inadequacy of conventional drying, the industry turned to techniques involving the precipitation of heavy metal compounds from the raw sludge so as to produce cleaner material for disposal. Of course, one of the by-products of such precipitation is itself hazardous sludge, sludge which though smaller in volume than the original material, contains a higher concentration of hazardous compounds and hence has a higher specific toxicity. Thus, the precipitation approach simply shifted to a new arena the waste treatment problem presented by the sludge.

It was in that context that the EPA published EPA/530-SW-88-0009-I, Best Demonstrated Available Technology (BDAT) Background Document for F006, which summarized current F006 treatment methods. The methods which that document sets out for treating electroplating waste can be categorized as: stabilization, vitrification, and high-temperature metal recovery. Of these, the only realistic methods at present involve stabilization.

Stabilization methods work by locking the sludge's hazardous materials in place rather than removing or chemical modifying them. Prior stabilization methods have required that one add large quantities of a stabilizing compound such as Portland cement to the sludge, and then cure the mixture. Leaching of metals and other toxic substances from the resulting waste is then impeded by the entrapment of those substances within the solid matrices established throughout the sludge by the stabilizing agent.

There are four serious drawbacks associated with traditional stabilization. First, it requires de-watering of the sludge as a prerequisite. The conventional methods of dewatering sludge include pressing, centrifuging, and conventional heat drying: all are time-consuming and expensive. Secondly, the addition of the stabilizing agent increases the weight and volume of sludge by a great deal, up to 150%. The increase in the amount of waste to be deposited is a serious problem, both in terms of shipping expense and allocation of scarce landfill space. Thirdly, traditional stabilizing methods require a long curing period. In addition to the time required to treat each load of sludge, vast amounts of energy are used by the drying ovens. Lastly, traditional stabilization methods result in a waste product with little physical integrity, a situation which leads to crumbling and the production of large quantities of toxic dust and larger fragments. Not only are the toxic dust and fragments hazardous to personnel transporting and disposing of the waste, but the fragmentation increases the surface area exposed to leaching agents after disposal into the landfill and hence increases the likelihood of subsequent leaching.

An example of a stabilizing process requiring both the pre-treatment of the sludge and the addition of significant amounts of a thermoplastic stabilizing agent is described in U.S. Pat. No. 4,242,220 issued to Sato in 1980. Sato teaches a method of treating waste sludge requiring the following sequence of steps: (1) pre-treating the waste sludge until its water content is not greater than 13%, (2) using microwave radiation to weaken the coalescence between the sludge particles to the point where a powder results, (3) mixing a thermoplastic resin with that powder, (4) using microwave radiation to melt the resin so as to trap the sludge particles in an insoluble capsule, and (5) cooling and molding the mixture into a solid mass. In addition to being limited to sludge with a low water content and the fact that significant volume is added to the waste product, the Sato process requires two drying steps. (It is true that Sato utilizes microwave rather then conventional heating, a fact that within the context of the process provides a reduction in the total electrical energy required. It appears that the use of the heat is to effect physical rather than chemical change in the mixture, in distinction to the use of microwaves in the present applicant's invention.)

An example of a stabilizing process which requires the addition of large quantities of a glass-like stabilizing agent and which ultimately results in a brittle waste product is described in U.S. Pat. No. 4,221,680 issued to Hardwick in 1980. Hardwick teaches a radioactive waste sludge treatment requiring the following sequence of steps: (1) injecting a slurry containing radioactive wastes into open glass slugs, (2) placing the filled slugs in a microwave oven to dry the slurry while venting gases out of the oven and (3) fusing the dried slurry within the glass slug to produces a glass-like solid material. Although the Hardwick process appears to be able to handle sludge with a high water content, the dried slurry is not disposable until it has been fused with the glass slug. Not only does the glass add substantial volume to the waste product, but it has the additional disadvantage of providing only a brittle shell between the environment and the toxic slurry.

Apparatus to extrude sludge onto a belt and through a dryer system are generally recognized art. U.S. Pat. No. 4,043,047 issued to Galliker in 1977 discloses apparatus for reducing watery sludge to a friable mud. This apparatus utilizes a conventional drying process which would not be suitable for F006 sludge. It encompasses a piston pump extruder and an electrolytic heat treatment unit connected by a conveyor belt. It appears that the only way to adapt the Galliker apparatus to handle waste with different characteristics is by adjusting the speed of the pump so as to vary the quantity of materials per unit of time passing through the drying chambers.

What is needed is a waste treatment process that can treat toxic sludge possessing a high and variable water content so as produce a readily disposable, cohesive solid waste product without significantly increasing the total weight or volume to be disposed of. Furthermore, waste treatment apparatus is needed which is easily adapted to the landfill preparation of electroplating wastes possessing a wide variety of physical and chemical characteristics.

SUMMARY OF THE INVENTION

The invention encompasses an industrial waste-treatment process and the apparatus devised for utilizing that process. Its object is to reduce the hazards associated with heavy metal sludge wastes to the point where the resultant product is acceptable for land disposal in accordance with U.S. Environmental Protection Agency regulations and, moreover, to do this without the weight increase inherent in traditional treatments of such sludges. This objective is accomplished by forming hydrophobic coacervate bonds throughout the waste in such a way that a relatively lightweight solid, resistant to leaching and dusting, results. More particularly, the sludge is first mixed with a small amount of a metallic soap or hydroxide such as aluminum hydroxide. The mixture is extruded as a thin ribbon into the inlet port of apparatus consisting of an alternating series of induction heaters and vacuum chambers which have the effect of adding at only slightly elevated temperatures the energy necessary to complete the coacervate bonding while removing the water forced to the surface of the ribbon by the heating and chemical reaction. The substance produced at the outlet of this apparatus is a dry, pumice-like substance capable of meeting the EPA's TCLP criteria and suitable for shipping to a disposal site. Pivotal to the practicality of the invention is the fact that its process for stabilization adds very little to the weight and the volume of the product to be disposed of.

The key to the invention is the high efficiency with which it enables metallic soaps to form leach-resistant matrices for the various sludge constituents which need to be stabilized. This efficiency is measured both by the lightness of the final product and by the very short time which is required to achieve that final product. Part of this efficiency is related to the method by which energy is added to establish the matrix-forming bonds. By using induction heating, a low-temperature energy transfer can be accomplished. To achieve a comparable energy transfer using conventional ovens would require either a much longer time or a much higher temperature. Higher temperatures cause a breakdown of the sludge components, producing dusting, among other undesirable results. The disadvantages of an increased processing time are obvious.

The sludge as received can contain a significant amount of water, both free and as loosely-bound waters of hydration. Aqueous solutions of metallic soaps are then added to the sludge, leading to the formation of coacervate bonds between the metallic soaps and the sludge. Because these bonds are hydrophobic, one of their effects is to force the free and loosely-bond water molecules out of the sludge. These water molecules then appear on the surface of the sludge ribbons. As the sludge ribbons are alternately passed through induction heating zones and vacuum drying zones, the water is sequentially driven up to the surface and then evaporated or simply wiped off by mechanical means. Because of the modular nature designed into the total apparatus, the system can be adapted to a variety of sludge characteristics: induction heating zones and vacuum drying zones can be added or subtracted.

PREFERRED EMBODIMENT OF THE INVENTION

1. The Apparatus

Figure 1:
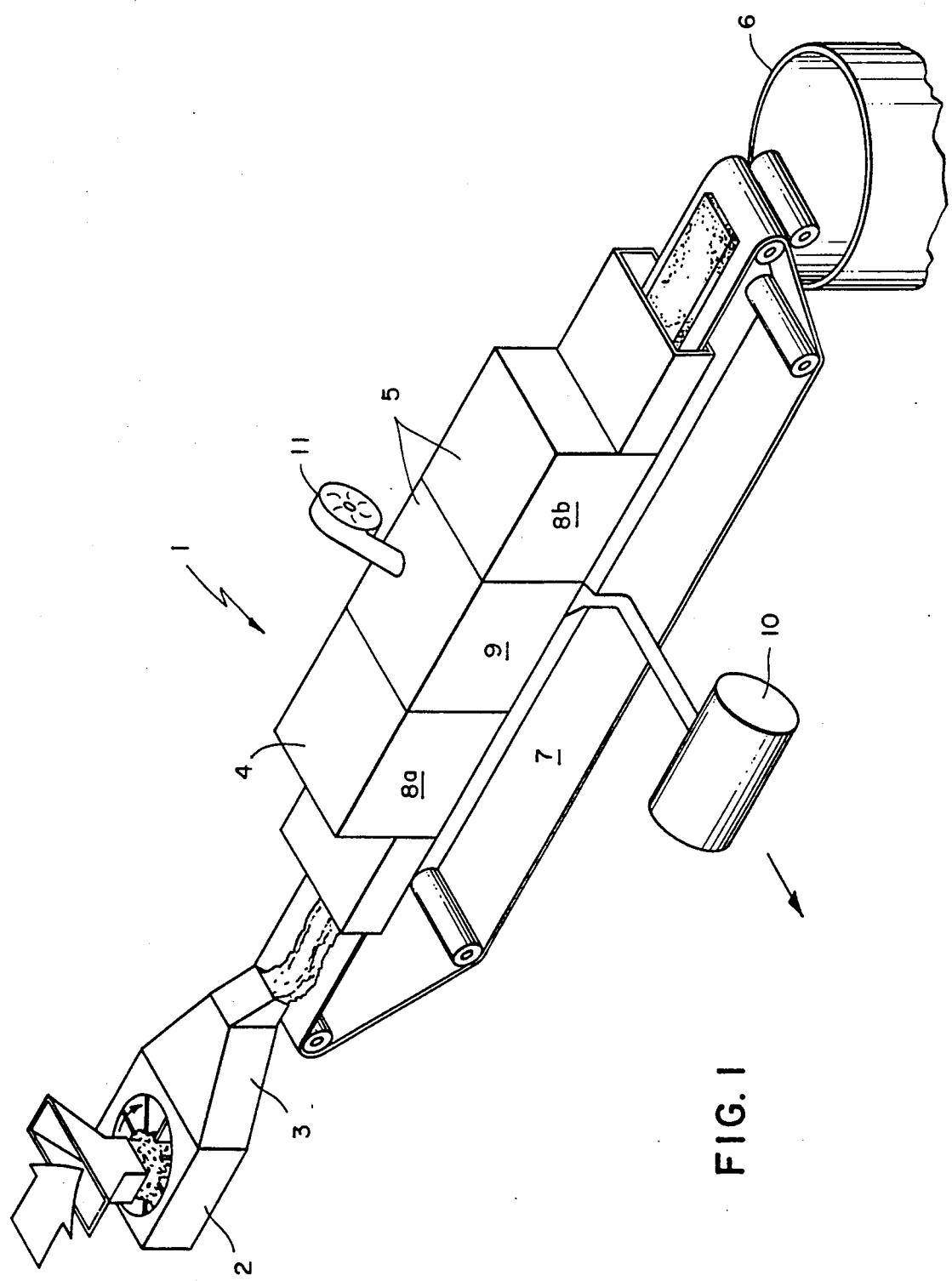
FIG. 1 shows a perspective view of the apparatus used to carry out the process claimed.

FIG. 1 depicts the preferred embodiment of a sludge processor 1. In its preferred embodiment the sludge processor 1 comprises a conventional industrial mixer 2, a sludge extruder 3, a primary induction heating chamber 4, vacuum and induction heating chamber pair 5, and a sludge transport container 6. Waste sludge is transported through said sludge processor 1 by a conveyor belt 7.

Said industrial mixer 2 is a crucial element of the invention because through mixing is essential to the process for which said sludge processor 1 is to be used. Said primary induction heating chamber 4 is comprised of an oven 8a. Said vacuum and induction heating chamber pair 5 is comprised of a vacuum evacuation chamber 9 and an oven 8b. Said vacuum evacuation chamber 9 drains into a condensing unit 10. In its preferred embodiment, said condensing unit 10 filters and then vents non-toxic gases and solvents into the outside atmosphere.

Because sludge is a highly variable mixture, a significant attribute of said sludge processor 1 is its modularity. The number of vacuum and induction heating chamber pairs 5 can be increased or decreased quickly and easily to handle the volume and characteristics of the specific sludge to be handled.

2. The Process

Figure 2:
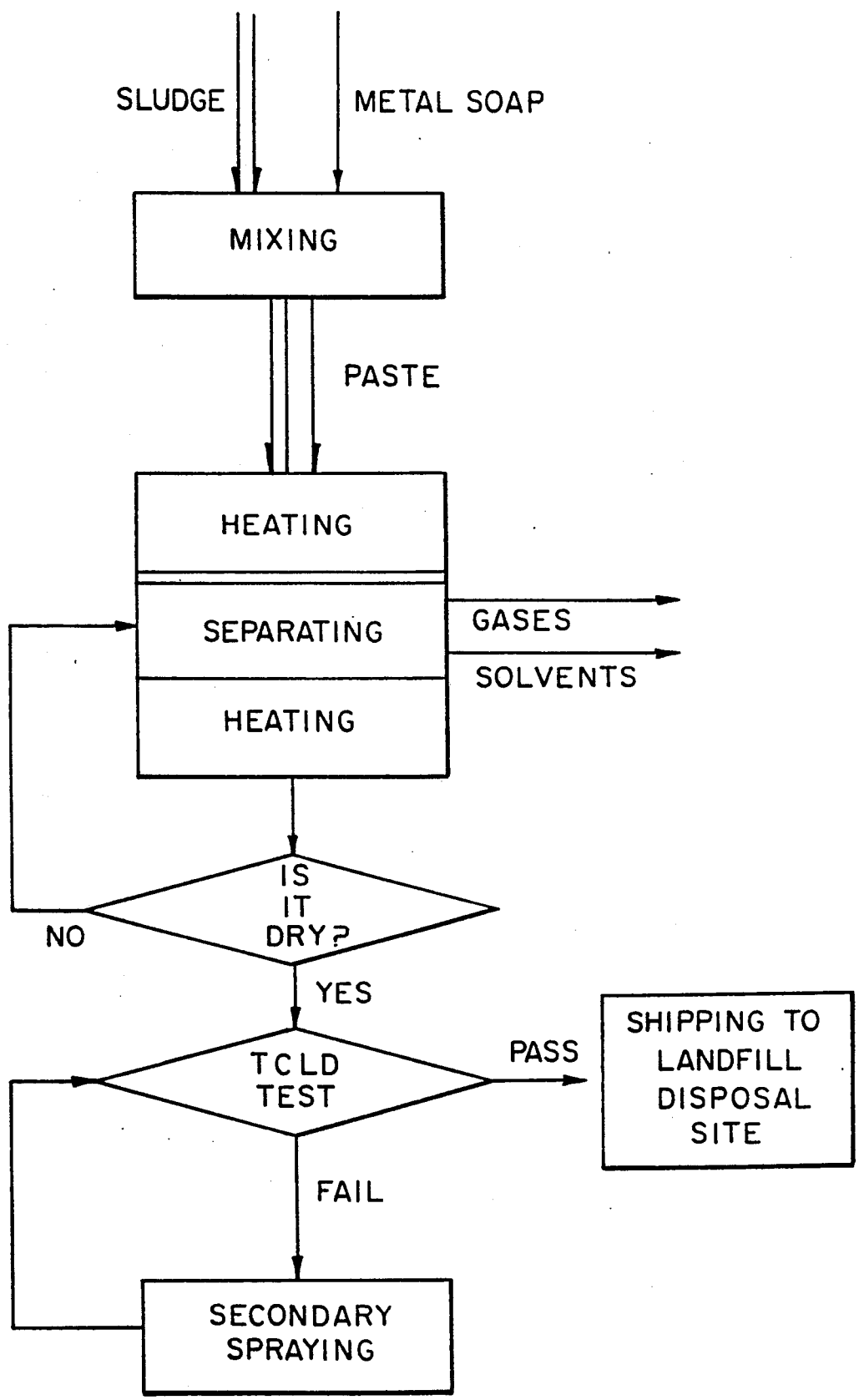
FIG. 2 is a flow chart of the steps of the treatment process.

Said sludge processor 1 is designed to process heavy metal sludge wastes generated by electroplating industries. The process is designed to result in a waste product capable of meeting the requirements of the TCLP. The steps shown in FIG. 2 are further described as follows:

(a) Mixing

A sludge with a water content as high as 95% is thoroughly mixed with a small quantity of a metallic soap or aluminum hydroxide. The amount and type of said metallic soap depends on the volumes and characteristics of said sludge to be processed. However, extremely thorough mixing results in the use of smaller quantities of said metallic soap and better chemical bonding. The rule of thumb is that one-tenth (1/10) to one-quarter (¼) the quantity of metallic soap will provide the same leaching characteristics with thorough mixing as is required without said mixing. Aluminum hydroxide works well with F006 sludges.

A major advantage of this process is that a successful bonding reaction is not dependent on the pH of said sludge. F006 sludge usually has a pH ranging from 7.8 to 12.5. Though a pH of 11 produces optimum solidification, the precise control of pH is not necessary to achieve desired bonding. A paste-like mixture of sludge and metallic soap may then result from said mixing step.

(b) Extrusion

Said paste-like mixture of sludge and metallic soap is extruded as a ribbon. The dimensions of said ribbon vary depending on the characteristics of said sludge. A width of 12 inches and a thickness of one-quarter (¼) inch works well for processing of approximately 50 pound per hour systems.

(c) Heating

Said ribbon is then heated by induction but in such a way that the surface temperature does not exceed 100° C. This allows enough energy to be added to melt said metallic soap. As said metallic soap melts it forms durable hydrophobic coacervate bonds and in this way establishes a multitude of cages around the toxic particles of said sludge.

It is in fact crucial to the process that the temperature of said paste-like mixture of sludge and metallic soap not exceed 100° C. A low drying temperature will de-water said ribbon of said paste-like mixture of sludge and metallic soap resulting in a cohesive pumice-like solid. In contrast, high drying temperatures produce a brittle waste product or toxic dust.

(d) Separation-of-Solvents

Said induction heating is accelerated by removing solvents, largely water, from said ribbon. Said bonding reaction between said metallic soap and said sludge is hydrophobic and forces free and loosely bonded water molecules out of said ribbon, whereupon said water molecules can then be mechanically removed. Solvent removal rates as high as 6500 grams per hour for 1000 watts of input microwave power have been achieved. A major advantage of this process is that said ribbon does not have to be pre-dried to a specific moisture level before being processed so as to pass said TCLP.

(e) Repetition

Sequential repetition of said heating and said separation-of-solvents steps results in a cohesive pumice-like solid waste product.

(f) Testing

The TCLP involves reducing the particle size of a EPA regulated waste and defining the elements of said EPA regulated waste by analytical methods. The success of the process is determined by comparing the results of said TCLP to EPA regulations which are set out in terms of TCLP toxicity levels.

(g) Secondary Spraying

If said cohesive pumice-like solid waste product fails to meet EPA regulations, a solution of 3 percent aluminum soap (aluminum reacted with long-chain fatty acids typically used in soap manufacture) dissolved in isopropyl alcohol is sprayed over the surface of said cohesive pumice-like solid waste product. After curing for 24 to 48 hours, said cohesive pumice-like solid waste product will pass said EPA regulations for TCLP testing.

In an alternative to the preferred embodiment, said sludge processor 1 additionally comprises two vacuum boxes and an absorbent conveyor belt, wherein said adsorbent conveyor belt carries said waste sludge over said vacuum boxes. The alternative to the preferred embodiment also comprises an air draw 11 on vacuum evacuation chamber 9 to remove contaminated air from said vacuum evacuation chamber 9 through an activated carbon filter and to exhaust the filtered air.

3. Examples of Process Using Typical F006 Sludge

EXAMPLE 1

SLUDGE COMPOSITION NO. 1

The first example of the effectiveness of the Process involved the treatment of an F006 sludge at 11.9% solids, by weight, and a pH of 7.9. The solids content included:
Chromium (Cr)—38,500 parts per million (ppm)
Copper (Cu)—4,200 ppm
Cadmium (Cd)—120 ppm
Lead (Pb)—310 ppm
Zinc (Zn)—245 ppm
Aluminum (Al)—122,000 ppm
Iron (Fe)—14,300 ppm
Cyanide (CN)—14 ppm.

Aluminum stearate was added to Sludge Composition No. 1, in quantities ranging from 0.1% to 2.0% by weight of sludge. The sludge and aluminum stearate were mixed and the resulting material pressed to a ribbon 12 inches wide and one-quarter (¼) inch thick. The ribbon was continuously dried in the manner indicated in steps 2c and 2d of the Process. A comparison of the TCLP results for the sludge dried, but without aluminum stearate treatment and the sludge dried after treatment (for a 0.1% quantity of aluminum stearate only) are provided in Table 1. The solvent removal efficiency, measured as a function of the drying process time, and determined as a function of the quantity of aluminum stearate added to the sludge, is provided in Table 2.

TABLE 1

Results of TCLP testing for aluminum stearate treated (0.1% by weight) and untreated Sludge Composition No. 1.

| Leachate | 0.1% alum. stear. treated sludge | Untreated sludge |
| --- | --- | --- |
| Cr | 0.012 ppm | 2.21 ppm |
| Cd | 0.005 ppm | 0.64 ppm |
| Pb | 0.018 ppm | 3.14 ppm |
| Cu | 0.043 ppm | 0.88 ppm |
| Zn | 0.011 ppm | 1.23 ppm |

Note: All other aluminum stearate quantities evaluated (0.2%, 0.5%, 1.0% and 2.0%) met EPA regulation levels.

TABLE 2

Solvent removal rates for six quantities of aluminum stearate mixed with Sludge Composition No. 1.

| Amt. of alum. stear. added to sludge | Grams solvent removed per KWH of energy in | Final solids content sludge |
| --- | --- | --- |
| 0.1% (by wt.) | 1018 | 85.8% |
| 0.1% | 1440 | 86.2% |
| 0.2% | 1792 | 86.8% |
| 0.5% | 2464 | 86.6% |
| 1.0% | 3182 | 86.9% |
| 2.0% | 3740 | 87.4% |

Untreated sludge, dried as indicated in steps 2c and 2d of the Process, was sprayed, following step 2g of the Process, with a solution containing 3.0% aluminum stearate dissolved in isopropyl alcohol in a ratio of five grams of the solution to 200 grams of dried sludge. The sprayed sludge was cured for 24 hours at room temperature and TCLP tested. The results are presented in Table 3 with a comparison to TCLP results for the dried, untreated sludge.

TABLE 3

Results of TCLP testing for dried, untreated Sludge Composition No. 1, and the same sludge dried, and then sprayed with 3.0% aluminum stearate in isopropyl alcohol and cured for 24 hours at room temperature.

| Leachate | 3.0% alum. stear. is isopr. alc. spray treated sludge | Untreated sludge |
| --- | --- | --- |
| Cr | 0.114 ppm | 2.21 ppm |
| Cd | 0.022 ppm | 0.64 ppm |
| Pb | 0.018 ppm | 3.12 ppm |
| Cu | 0.210 ppm | 0.88 ppm |
| Zn | 0.120 ppm | 1.23 ppm |

EXAMPLE 2

SLUDGE COMPOSITION NO. 2

The second example of the effectiveness of the Process involved the treatment of a heavy metal sludge at 14% solids, by weight, and a pH of 7.9. The solids content included:
Cr—4,200 ppm
Cu—31,500 ppm
Cd—2,850 ppm
Pb—240 ppm
Mercury (Hg)—8 ppm
Zn—850 ppm.

The sludge was dried, following steps 2c and 2d of the Process, to a solids content of 88% by weight and tested by the TCLP for leachate levels. This batch of sludge was then mixed in a one-to-one ratio with dry cement dust, per EPA BDAT recommendations, and allowed to cure for 48 hours. It was then tested by the TCLP for leachate levels. Results of these tests are provided in Table 4.

Also provided in Table 4 are the results of TCLP testing of Sludge Composition No. 2 after treatment with aluminum hydroxide. Specifically, 1.0% of aluminum hydroxide solids was added, as a 50% paste in water, to the sludge and mixed per step 2a of the Process. The treated sludge was extruded and microwave dried per steps 2c and 2d of the Process, to an 80% solids content. The treated and dried sludge was tested by the TCLP for leachate levels.

TABLE 4

Results of TCLP testing for aluminum hydroxide treated, untreated, and EPA-BDAT treated Sludge Composition No. 2.

| Leachate | 1.0% alum. hydrox. untreated sludge | untreated sludge | BDAT treat sludge |
| --- | --- | --- | --- |
| Cr | <0.01 ppm | 2.65 ppm | 1.85 ppm |
| Cd | <0.01 ppm | 0.08 ppm | 0.04 ppm |
| Pb | <0.01 ppm | <0.01 ppm | <0.01 ppm |
| Cu | 0.15 ppm | 4.50 ppm | 3.68 ppm |
| Hg | <0.01 ppm | <0.01 ppm | <0.01 ppm |
| Zn | <0.01 ppm | 1.95 ppm | 0.02 ppm |

It is to be understood, of course, that the foregoing description relates to particular embodiments of the general invention and that modifications or alterations of these embodiments may be made without departing from the spirit or scope of the invention as set forth in the appended claims.

I claim:

1. Modular-based apparatus for automatically and continuously treating a solvent containing waste sludge with a metallic soap comprising:
   (a) means for mixing said metallic soap with said waste sludge resulting in a mixture;
   (b) means for extruding said mixture in a continuous ribbon;
   (c) means for initially induction-heating said mixture;
   (d) a plurality of alternating chamber pairs wherein one chamber in each pair provides a means for separating said solvents from said mixture while second chamber in each of said pairs provides a means of induction-heating said mixture;
   (e) a means for venting and draining said solvents;
   (f) a means of storing a mixed sludge waste from which sovents have been separated;
   (g) conveyor means for continuously transporting said mixture from said extruding means through said initial means of induction heating said alternating chamber pairs to said storing means.

2. Apparatus of claim 1 where said mixing means is a blender.

3. Apparatus of claim 2 where said initial means of induction heating and said means of induction heating are microwave ovens.

4. Apparatus of claim 3 where said means for separating-solvents is a vacuum chamber.

5. Apparatus of claim 4 where said means for venting and draining said solvents is a condensing unit.

6. Apparatus of claim 5 where said storing means is a 55 gallon barrel.

* * * * *